United States Patent [19]

Warren

[11] Patent Number: 5,041,306

[45] Date of Patent: Aug. 20, 1991

[54] METHOD OF FORMING ELECTRICALLY CONDUCTIVE NICKEL SULFIDE COATINGS ON DIELECTRIC SUBSTRATES

[75] Inventor: Leslie F. Warren, Camarillo, Calif.

[73] Assignee: Rockwell International Corporation, El Segundo, Calif.

[21] Appl. No.: 374,853

[22] Filed: Jul. 3, 1989

Related U.S. Application Data

[62] Division of Ser. No. 935,888, Nov. 28, 1986, abandoned.

[51] Int. Cl.$^5$ .......................... B05D 5/12; B05D 3/02
[52] U.S. Cl. ............... 427/126.1; 427/126.2; 427/226; 428/698
[58] Field of Search .............. 427/126.1, 126.2, 226; 252/519, 518; 428/698, 392, 285, 290, 395, 389

[56] References Cited

U.S. PATENT DOCUMENTS

| | | | |
|---|---|---|---|
| 4,061,830 | 12/1977 | Greenberg | 428/469 |
| 4,159,914 | 7/1979 | Jordan et al. | 136/89 TF |
| 4,336,028 | 6/1982 | Tomibe et al. | 8/624 |
| 4,363,707 | 12/1982 | Prigent et al. | 204/129 |
| 4,556,507 | 12/1985 | Tomibe et al. | 252/518 |
| 4,556,508 | 12/1985 | Tomibe et al. | 252/518 |

*Primary Examiner*—Norman Morgenstern
*Assistant Examiner*—Roy V. King
*Attorney, Agent, or Firm*—Charles T. Silberberg; Max Geldin

[57] ABSTRACT

An electrically conductive article comprising a dielectric substrate, such as a fabric, e.g., fiberglass fabric, and an electrically conductive inorganic nickel sulfide layer which is adherent to the substrate and has good electrical conductivity and stable electrical characteristics at high temperature. Such article is produced by contacting a porous dielectric substrate, such as fiberglass fabric, with an aqueous solution containing a soluble nickel salt, such as nickel sulfate, and a sulfur donor, such as sodium thiosulfate, drying the resulting wet substrate at ambient temperature, and heating the resulting substrate at elevated temperature of about 100° C. to about 400° C. to form an electrically conductive layer of nickel sulfide on the substrate.

16 Claims, No Drawings ated with copper sulfide coatings on substrates are known. Thus, European Patent No. 160,406, published Nov. 6, 1985, discloses electrically conductive cupric sulfide coated polymers, prepared by treating polymers, such as acrylic fabric, with an aqueous solution containing cupric sulfate and sodium thiosulfate to form an electrically conductive cuprous sulfide layer. The cloth is then sulfurized in a toluene solution of sulfur containing butylamine.

METHOD OF FORMING ELECTRICALLY CONDUCTIVE NICKEL SULFIDE COATINGS ON DIELECTRIC SUBSTRATES

This is a divisional of copending application Ser. No. 06/935,888 filed on Nov. 28, 1986, now abandoned.

BACKGROUND OF THE INVENTION

This invention relates to electrically conducting materials, and is particularly directed to dielectric substrates containing an inorganic conductive coating having high temperature stability, and to a process for the preparation of such articles.

Existing stable organic conducting polymer systems, e.g., polypyrrole, have been found highly useful for production of conductive structural composites, particularly in the aircraft industry. While the processing features of polypyrrole for large scale applications have been found excellent, such conductive polymers have exhibited electrical instability at temperatures greater than 400° F. Advanced aircraft designs which may incorporate these materials can require such temperatures to cure resins, such as epoxies and bismaleimides, used for encapsulating or forming conductive composites with such conductive material, such as polypyrrole.

Electrically conducting copper sulfide coatings on substrates are known. Thus, European Patent No. 160,406, published Nov. 6, 1985, discloses electrically conductive cupric sulfide coated polymers, prepared by treating polymers, such as acrylic fabric, with an aqueous solution containing cupric sulfate and sodium thiosulfate to form an electrically conductive cuprous sulfide layer. The cloth is then sulfurized in a toluene solution of sulfur containing butylamine.

Japanese Application No. 83/240,918, published Dec. 22, 1983, discloses conductive fibers coated and/or filled with CuS. Thus, acrylonitrile-methylmethacrylatesodium styrenesulfonate copolymer fibers were soaked in aqueous cupric sulfate-sodium thiosulfate solution and heated at 95° C. to give fibers coated with CuS.

It is known that nickel sulfide can be precipitated by boiling a nickel salt solution with sodium thiosulfate.

An object of the present invention is the production of dielectric substrates, such as fiberglass cloth, containing an electrically conductive inorganic coating having electrical stability at high temperatures, and the provision of a process for producing such electrically conductive substrates.

Another object is the preparation of dielectric substrates, e.g., of structural fabrics, such as fiberglass cloth, containing an inorganic electrically conductive coating having good adhesion to the substrate, and having good electrically conductivity, and which can be applied to the substrate using large scale applications and simple processing techniques.

SUMMARY OF THE INVENTION

The above objects are achieved and an electrically conductive article is produced, according to the invention, comprising a dielectric substrate, which is preferably porous, and an electrically conductive layer of nickel sulfide, by a process which comprises contacting such dielectric substrate with an aqueous solution containing a soluble nickel salt capable of being converted to nickel sulfide, and a sulfur donor, such as sodium thiosulfate, drying the resulting wet substrate, and heating the resulting substrate at elevated temperature ranging from about 100° C. to about 400° C.

According to a preferred embodiment, the dielectric substrate employed is fiberglass cloth, and the reagents of the aqueous treating solution are nickel sulfate and sodium thiosulfate.

In an additional feature of the invention, the substrate, e.g., fiberglass cloth, is sized with a compound which provides a hydrophilic group comprising a pendant amino or mercapto group, which attaches to the nickel ions during aqueous solution treatment, resulting in a highly adherent coating of nickel sulfide on the substrate.

According to another feature of the invention, it has been found that a higher conversion of the nickel salt to nickel sulfide is obtained if ammonia is added to the aqueous treating bath to raise the pH of the bath to about 7 to 10.

The resulting substrate, e.g., fiberglass cloth, coated with the electrically conducting nickel sulfide coating, can be encapsulated or laminated with high temperature curing resins, such as epoxy or bismaleimide, to produce structural electrically conducting composites.

It has been found that nickel sulfide based material is readily applied, particularly to structural fabrics, such as fiberglass cloth, using simple techniques, such as roller processing. Deposit adhesion of the nickel sulfide is surprisingly good, and the nickel sulfide coating produced by the invention process has good conductivity. Further, electrical response shows no degradation during resin, e.g., epoxy or bismaleimide, composite fabrication, or by exposure to temperatures as high as 600° F. Such features render the nickel sulfide coated substrates of the invention extremely attractive for the production of advanced structural composites used in aerospace.

DETAILED DESCRIPTION OF THE INVENTION AND THE PREFERRED EMBODIMENTS

According to the invention, a dielectric or electrically insulating material, and which is preferably porous, that is, it possesses voids or interstices, is dipped into an aqueous solution containing a soluble nickel salt capable of being converted to nickel sulfide, and a sulfur donor.

In carrying out the invention process, porous dielectrics or electrically insulating structural materials can be used, such as a porous ceramic, a porous glass, e.g., a frit, a porous or reticulated organic foam, e.g., polyurethane, or other polymers, such as polyethers and polyalcohols, a fabric, which can be woven or non-woven, such as an inorganic fabric, e.g., fiberglass fabric, a mixed oxide fabric, such as alumina/silica/boria fabric, e.g., Nextel, or the silicon carbide fabric marketed as Nicalon, or a synthetic organic fabric, e.g., an aromatic polyamide fabric, such as the fabric marketed as Kevlar, a polyester, such as Dacron cloth or Mylar, or a polyimide, such as the material marketed as Kapton, and the like. The insulating material can vary in thickness, usually from about 2 to about 15 mils.

It will also be understood that the substrate alternatively can be in the form of a fiber, e.g., a glass fiber or Nicalon fiber, to which a nickel sulfide layer is applied, according to the invention. Such coated fibers can then be formed into a tape or cloth fabric containing the nickel sulfide coating.

As an important feature of the invention, it has been found that sizing of the dielectric substrate, such as fiberglass fabric, by treatment with sizing agents which contain a hydrophilic group, providing a pendant amino or mercapto group in the substrate, enhances adherence of the nickel sulfide coating to the substrate. Examples of sizing agents for this purpose include 3-aminopropyl triethoxy silane, 3-mercaptopropyl trimethoxy silane, and [3-(trimethoxysilyl) propyl] ethylene diamine. These sizing agents form surface-bound pendant amino or mercapto groups which attach or coordinate nickel ions to provide nucleation sites for nickel sulfide deposition. A fiberglass fabric supplied with an "aminosilane finish", i.e., the bare fabric has been treated with an organosilane sizing reagent containing a pendant amino functionality, is marketed as 7781 fiberglass fabric or 7781 Uniglass. The dielectric fabric marketed as Nicalon can contain strongly nickel complexing mercapto (—SH) and diamine (—NH$_2$) functionalities.

The nickel salt employed in the aqueous treating solution is preferably nickel sulfate. However, other soluble nickel salts, such as nickel chloride, nickel acetate, nickel nitrate, nickel tetrafluoroborate, and the like, can also be employed. The concentration of the nickel salt, e.g., nickel sulfate, in the aqueous treating solution can vary and can range from about 0.05 to about 2, preferably about 0.1 to about 1, molar.

The sulfur donor or sulfur releasable substance is preferably a soluble thiosulfate, e.g., an alkali metal thiosulfate, particularly sodium thiosulfate. However, other sulfur donor or sulfur releasable substances which can be employed include other alkali metal thiosulfates, such as potassium thiosulfate and ammonium thiosulfate, thioacetamide, thiophosphate salts, such as the alkali metal thiophosphates, e.g., sodium thiophosphate, and ammonium thiophosphate, thiourea, and the like. The concentration of sulfur donor in the aqueous treating solution can vary but is generally within the same range of concentration, i.e., about 0.05 to about 2, preferably about 0.1 to about 1, molar, as the concentration of the nickel salt. However, within the above-noted ranges, the concentration of sulfur donor employed in the aqueous solution can be the same as or different from the concentration of the nickel salt. In preferred practice, an aqueous solution, which is one molar in each the nickel salt and the sulfur donor, is used.

It is noted that an aqueous solution of the nickel salt, e.g., NiSO$_4$, and the sulfur donor, e.g., Na$_2$S$_2$O$_3$, is preferably employed. Use of organic solvents, such as methanol, is not preferred, particularly from the standpoint of dissolving sufficient quantities of one or the other of the reagents.

The pH of the above aqueous treating solution is usually about 5, and the use of such aqueous treating solution results in the deposition of nickel sulfide layers on the substrate, which have good electrical conductivity. However, according to a further feature of the invention, it has been found that higher conversions of the nickel salt to nickel sulfide, and thicker nickel sulfide coatings, can be obtained, according to the invention, by adding ammonia, e.g., in the form of concentrated ammonium hydroxide, to the aqueous treating solution in an amount sufficient to raise the pH of the aqueous solution to about 7 to 10.

However, when employing nickel acetate as the nickel salt, it has been found that higher nickel sulfide loadings can be obtained with or without raising the pH, as noted above.

The aqueous treating solution is maintained at about ambient temperature during treatment of the dielectric substrate, e.g., fiberglass cloth, therein. The substrate is maintained or treated with the aqueous solution for a time sufficient to wet the dielectric substance with the aqueous solution. The wet dielectric substrate, e.g., the wet fiberglass cloth, is then air-dried, usually at ambient temperature, as by blowing on the wet substrate with a fan, e.g., for a period of about 5 to about 10 minutes. It is not necessary that the treated substrate be completely dried. It can be partially air-dried so that the substrate still contains some water before being subjected to the subsequent high temperature treatment. Hence, the substrate can still be damp or wet to the touch following the drying step. Such drying is carried out for a period of time such as to avoid any appreciable development of an insulating or low conductivity form of nickel sulfide, prior to the subsequent high temperature heating step. Thus, the term "drying" as employed herein can denote partial drying, as well as more complete drying, so long as the above detrimental formation of low conductivity nickel sulfide is avoided during such drying step.

The resulting dried substrate is then heated at a temperature and for a time sufficient to "develop" black nickel sulfide onto the dielectric substrate, e.g., onto the fibers of a fabric substrate, such as fiberglass cloth. Such elevated heating step is generally carried out in an oven at a temperature ranging from about 100° C. to about 400° C., preferably about 110° C. to about 320° C. Below 100° C., and down to room temperature, as during the previous drying step, the black deposits which form are electrically non-conducting or are of very low conductivity, and presumed to be primarily Ni(OH)S. The period of heating can range from 30 seconds up to about 1 hour, usually about 2 to about 30 minutes. The higher the heating temperature, the shorter the time required for completion of the reaction to form the nickel sulfide deposit. The heating step "develops" black electrically conductive nickel sulfide onto the dielectric substrate according to the following reaction:

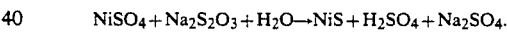

$$NiSO_4 + Na_2S_2O_3 + H_2O \rightarrow NiS + H_2SO_4 + Na_2SO_4.$$

According to the present invention, it is seen that the reaction between the nickel salt and sulfur donor to produce conductive nickel sulfide does not occur during treatment of the dielectric substrate in the aqueous solution of such reagents but, rather, occurs subsequently during the heating step, between such reagents deposited on the substrate, under substantially anhydrous conditions and under the elevated temperatures noted above. Thus, in effect, according to the present invention, the above reaction is localized onto the surface of a substrate. This differentiates markedly from the above-noted known reaction for precipitating nickel sulfide in a boiling aqueous solution of a nickel salt containing sodium thiosulfate.

Reaction by-products following the above heating step can be removed by washing the nickel sulfide coated dielectric substrate with water. The nickel sulfide layer deposit is formulated as NiS$_x$ rather than pure NiS, due to its apparently polymeric nature. It has been observed, for example, that in one form, the nickel sulfide is essentially amorphous but with some crystalline characteristics, and deposits uniformly on the dielectric substrate and wraps around each fiber of the substrate, or each fiber of the cloth, where the substrate is a fabric, such as fiberglass fabric. The resultant dielectric substrate contains an adherent, stable black coating of electrically conductive nickel sulfide, which imparts a sheet resistivity to the substrate material, which can range from 10 to 10,000 ohms per square, and for higher conductivity applications can range from 100 to 15 ohms per square. The term "ohms per square" is defined as the bulk resistivity of the sample in ohms×cm divided by the thickness in cm. Sheet resistivity is proportional to the reciprocal of electrical conductivity. The amount of nickel sulfide formed can vary but is usually present in an amount of about 0.1 to about 2%, by weight.

The resulting conductive structural materials are stable to advanced composite processing. The term "advanced composite processing" refers to further processing of the dielectric substrate containing the conductive nickel sulfide layer or coating at high temperatures while the conductivity of the coating at high temperatures while the conductivity of the coating remains stable at such high temperatures. Thus, the nickel sulfide coated dielectric articles of the invention can be subjected to encapsulation or lamination with resins, such as an epoxy or bismaleimide resin, at elevated temperatures of the order of about 350° F. without electrical conductivity degradation of the nickel sulfide coating. It has been found that when the nickel sulfide coated dielectric materials of the invention are subjected to temperatures of about 600° F. in an inert argon or air atmosphere, the electrical response of the nickel sulfide coated dielectric, e.g., fabric, remained stable.

Further, the nickel sulfide coating on the dielectric substance produced according to the invention has a non-parasitic condition associated with it, that is, the composite has load bearing characteristics, and the conductive coating forms an integral part of the load bearing structure.

As previously noted, the dielectric material, e.g., fiberglass fabric, coated with the conductive nickel sulfide, can be encapsulated in an elevated or high temperature curing resin, such as an epoxy or bismaleimide resin, and such encapsulation further stabilizes the electrical characteristics of the nickel sulfide deposit. The encapsulation can be carried out by painting or coating the conductive substrate with the resin, or by dipping such substrate in the resin. Following coating with the encapsulating resin, the resulting system can be cured using standard curing techniques. Thus, for example, the nickel sulfide coated substrate can be painted with an epoxy resin, such as Shell's Epon 9102 epoxy resin, and a curing agent, and subjected to curing at elevated temperature between 320° F. and 350° F. and elevated pressure, e.g., 150 psi, resulting in a laminate exhibiting good electrical and mechanical properties.

To increase the conductivity of the nickel sulfide-coated dielectric substrate, additional or repeated treatments of such nickel sulfide-coated fabric, for example, a fabric, such as fiberglass fabric, with the aqueous solution of nickel salt and sulfur donor, followed by heating at elevated temperature, can be carried out. Hence, the conductivity of the nickel sulfide coated substrate can be adjusted by the number of such treatments, as well as by varying the concentrations of the nickel salt, e.g., $NiSO_4$, and sulfur donor, e.g., $Na_2S_2O_3$.

The following are examples of practice of the invention.

EXAMPLE 1

A fiberglass cloth (7781 Uniglass) was treated in an aqueous solution of $NiSO_4$ and $Na_2S_2O_3$, each at a concentration of 1 molar. The wet cloth was partially air-dried at ambient temperature by blowing the material with a fan for about 5–10 minutes. The partially dried cloth was placed in an oven at 100° C. for 30 minutes. The resulting cloth contained an adherent, stable black coating of electrically conductive nickel sulfide which imparted a sheet resistivity of 300 ohms/square to the material, compared with an infinite resistivity for the untreated fiberglass cloth.

EXAMPLE 2

A fiberglass fabric coupon (7781 Uniglass) was dipped into aqueous 1M each of $NiSO_4$ and $Na_2S_2O_3$. The sample was air-dried and heated in an oven at 120° C. for 5 minutes. The heating step "developed" black conductive nickel sulfide onto the fibers of the cloth.

Reaction by-products were removed by washing the material with water. Adhesion of the deposit on the fiberglass was at least as good as that of the organic conducting polymer, polypyrrole. Conductivity levels corresponding to as little as 50 ohms/square were measured with a two-probe ohmeter. The nickel sulfide deposit was found to be of an apparent polymeric nature, in the form of $NiS_x$.

Encapsulation in an epoxy or bismaleimide resin further stabilized the nickel sulfide electrically conductive deposit. No conductivity loss occurred during the resin processing, even at temperatures as high as 475° F. used for bismaleimide post-curing. At 600° F. in air or in an inert argon atmosphere, the electrical response of the unencapsulated nickel sulfide coated fabric was still stable.

EXAMPLE 3

A 4"×4" swatch of 7781 fiberglass was soaked in an aqueous solution containing $NiSO_4$, 1M, and $Na_2S_2O_3$, 1M for 5 minutes. The fabric was removed and air-dried at room temperature with a small fan, taking about 5 minutes. At this point, when the edges of the cloth began to darken, the cloth was hung on a rack and placed in an oven at 200° C. for 5 minutes. The sample, now black with the nickel sulfide deposit, was washed with room temperature water, rinsed with acetone, and dried in an oven at 200° C. for 5 minutes. The measured sheet resistivity was 20 ohms/square.

EXAMPLE 4

Using the procedure in Example 3, an aqueous solution containing 0.7M each of $NiSO_4$ and $Na_2S_2O_3$ generated a sample with a sheet resistivity of 55 ohms/square.

EXAMPLE 5

Using the procedure in Example 3, an aqueous solution containing 0.5M each of $NiSO_4$ and $Na_2S_2O_3$ generated a sample with a sheet resistivity of 450 ohms/square. A second treatment of the nickel sulfide-coated fabric with the same solution, followed by elevated temperature heat treatment, gave a sheet resistivity of 225 ohms/square.

EXAMPLE 6

Using the procedure in Example 3, an aqueous solution containing 0.5M each of $NiSO_4$ and $Na_2S_2O_3$ adjusted to a pH of 10 with concentrated ammonium hydroxide generated a sample with a sheet resistivity of 35 ohms/square.

EXAMPLE 7

Using the procedure in Example 3, an aqueous solution containing 0.25M each of $NiSO_4$ and $Na_2S_2O_3$ adjusted to a pH of 10 with concentrated ammonium hydroxide generated a sample with a sheet resistivity of 300 ohms/square.

EXAMPLE 8

The procedure of Example 3 was essentially followed, using an aqueous solution containing nickel acetate, 0.5 molar, and sodium thiosulfate, 0.5 molar. The measured sheet resistivity was 40 ohms/square.

EXAMPLE 9

Nickel acetate tetrahydrate, 5 g, and thioacetamide, 1.5 g, in 75 ml of methanol was used to treat a 3"×3" swatch of 7781 fiberglass. The air-dried sample was heat-treated at 120° C. for 10 minutes, washed with water and acetone, and oven-dried. The black treated fabric showed no conductivity with an ohmeter.

EXAMPLE 10

Using nickel chloride, nickel tetrafluoroborate, or nickel sulfate according to the procedure of Example 9 produced only light deposits of $NiS_x$, and the measured sheet resistivities were high, about $10^5$ to $10^6$ ohms/square.

EXAMPLE 11

Using the procedure in Example 3, an aqueous solution containing 1M each of $NiCl_2$ and $Na_2S_2O_3$ with a heat treatment of 130° C. for 10 minutes generated a sample with a sheet resistivity of 300 ohms/square. A second treatment in the same solution gave 60 ohms/square.

EXAMPLE 12

The procedure of Example 3 was essentially followed, using nickel chloride, 0.5 molar, and sodium thiosulfate, 0.5 molar. The measured sheet resistivity was 160 ohms/square.

EXAMPLE 13

A 3"×3" swatch of unsized Nicalon fabric, a trademark of Dow Corning, was treated with an aqueous solution of 1M each $NiCl_2$ and $Na_2S_2O_3$ and heat treated at 130° C. for 10 minutes. After washing and drying, the sample had a sheet resistivity of 17000 ohms/square.

EXAMPLE 14

A 3"×3" swatch of unsized Nicalon fabric was treated with a 1% aqueous solution of the diamine silane reagent, $H_2N(CH_2)_2NH(CH_2)_3Si(OCH_3)_3$, rinsed with water, and dried at 100° C. for 10 minutes. This sample was then treated as in Example 13 to give a cloth with a sheet resistivity of 2000 ohms/square.

EXAMPLE 15

A 4"×4" swatch of Kevlar fabric was treated with a 0.25M each solution of $NiSO_4$ and $Na_2S_2O_3$ adjusted to a pH of 10 with concentrated ammonium hydroxide as in Example 6 with a heat treatment temperature of 260° C. The resulting sheet resistivity measured 1000 ohms/square; after a second treatment under the same conditions, the reading was 800 ohms/square.

The following is an example of encapsulation of the nickel sulfide coated substrates of the invention with a resin.

EXAMPLE 16

Three 6"×6" swatches of nickel sulfide-coated fiberglass, net weight 21.08 g., net sheet resistivity 41 ohms/square, were painted with 27.4 g. of U.S. Polymeric 388D bismaleimide resin solution (26 g. solid/40 g. solution). The individual samples were pre-cured in a vacuum oven at 130° C. for 45 minutes. They were then laminated together in a hydraulic press using standard vacuum bag procedures. The cure cycle used involved heating to 177° C. and holding for 2 hours at 100 psi. A post-cure followed in which the sample was heated in an oven at 227° C. for 4 hours. The resin content of the resulting laminate was 28%, and it had a sheet resistivity of 28 ohms/square.

Instead of employing a dipping or immersion procedure for treating the dielectric substrate with the aqueous solution of nickel salt and sulfur donor, such treatment can alternatively be carried out by wetting or applying such solution to the substrate by means of a liquid dispenser, as by spraying or brushing the aqueous solution onto the substrate surface. Further, especially in the case of long sheets of substrate, a roller coating procedure for applying the aqueous treating solution to the substrate surface is particularly useful. Thus, 100 foot rolls of 12 inch fiberglass have been successfully treated with the aqueous treating solution and heated at elevated temperature according to the invention, using a simple roller unit and quartz strip heaters.

The conductive nickel sulfide materials produced according to the invention have application as conductive composite structural materials, resistive heating elements, semi-conductor components, in anti-static applications, in electromagnetic interference shielding applications, and as electrical conductors.

From the foregoing, it is seen that the present invention provides novel electrically conductive materials containing a readily processible inorganic conductive coating of nickel sulfide, having good conductivity, and which is chemically stable and resistant to degradation of its electrical characteristics at high temperatures, and which is amenable to the production of electrically conductive composite materials by encapsulation or lamination with resins, such as epoxies, at high temperatures.

Since various changes and modifications will occur to and can be made readily by those skilled in the art without departing from the invention concept, the invention is not to be taken as limited except by the scope of the appended claims.

What is claimed is:

1. A process for producing an electrically conductive article which comprises:
    contacting a dielectric substrate being a porous substrate selected from the group consisting of porous organic polymers and foams, organic and inorganic fabrics, porous glass and porous ceramics with a solution containing a soluble nickel salt capable of being converted to nickel sulfide, said soluble nickel salt selected from the group consisting of nickel sulfate, nickel chloride, nickel acetate, nickel nitrate and nickel tetrafluoroborate, and a sulfur donor, said sulfur donor being a sulfur releasable substance selected from the group consisting of alkali metal and ammonium thiosulfates, alkali metal and ammonium thiophosphates, thiourea, and thioacetamide, drying the resulting wet substrate for such a time as to avoid any appreciable development of an insulating or low conductivity form of nickel sulfide, and heating the resulting substrate under substantially anhydrous conditions at an elevated temperature ranging from about 100° C. to about 400° C. and reacting said nickel salt and said sulfur donor to form an electrically conductive coating of nickel sulfide on said substrate.

2. The process of claim 1, wherein said solution is an aqueous solution.

3. The process of claim 2, said substrate containing a sizing agent having a hydrophilic group.

4. The process of claim 2, said soluble nickel salt being nickel sulfate and said sulfur donor being sodium thiosulfate.

5. The process of claim 2, the nickel salt concentration ranging from about 0.05 to about 2 molar, and the sulfur donor concentration ranging from about 0.05 to 2 molar.

6. The process of claim 2, said aqueous solution being 1 molar in each the nickel salt and the sulfur donor.

7. The process of claim 2, said aqueous solution containing $NH_3$ in amount sufficient to maintain the pH of said solution at about 7 to 10.

8. The process of claim 2, said aqueous solution being at about ambient temperature, and said drying of the wet substrate taking place at about ambient temperature.

9. A process for producing an electrically conductive article which comprises:

contacting a dielectric substrate in the form of a fabric selected from the group consisting of fiberglass fabric, mixed oxide fabric, silicon carbide fabric, and a synthetic organic fabric, with an aqueous solution containing (1) a nickel salt selected from the group consisting of nickel sulfate, nickel chloride, nickel acetate, nickel nitrate, and nickel tetrafluoroborate, and (2) a sulfur donor selected from the group consisting of sodium thiosulfate, sodium thiophosphate, thiourea and thioacetamide, drying the resulting wet substrate at about ambient temperature and for such a time as to avoid any appreciable development of an insulating or low conductivity form of nickel sulfide, and heating the resulting substrate under substantially anhydrous conditions at an elevated temperature ranging from about 110° C. to about 320° C. and reacting said nickel salt and said sulfur donor to form an electrically conductive coating of nickel sulfide on said substrate.

10. The process of claim 9, said substrate containing a sizing agent having a hydrophilic group, said hydrophilic group comprising a pendant amino or mercapto group.

11. The process of claim 10, said nickel salt being nickel sulfate and said sulfur donor being sodium thiosulfate.

12. The process of claim 11, the nickel salt concentration ranging from about 0.1 to about 1 molar, and the sulfur donor concentration ranging from about 0.1 to about 1 molar.

13. The process of claim 12, said aqueous solution containing $NH_3$ in amount sufficient to maintain the pH of said solution at about 7 to 10.

14. The process of claim 13, said dielectric substrate being fiberglass fabric.

15. The process of claim 13, said dielectric substrate being silicon carbide fabric.

16. The process of claim 13, including repeating the steps of treatment of said substrate containing said nickel sulfide coating with said aqueous solution and of heating the resulting substrate at said elevated temperature.

* * * * *